April 8, 1952 F. W. McRAE 2,591,959
QUICK OPENING VALVE
Filed July 5, 1949
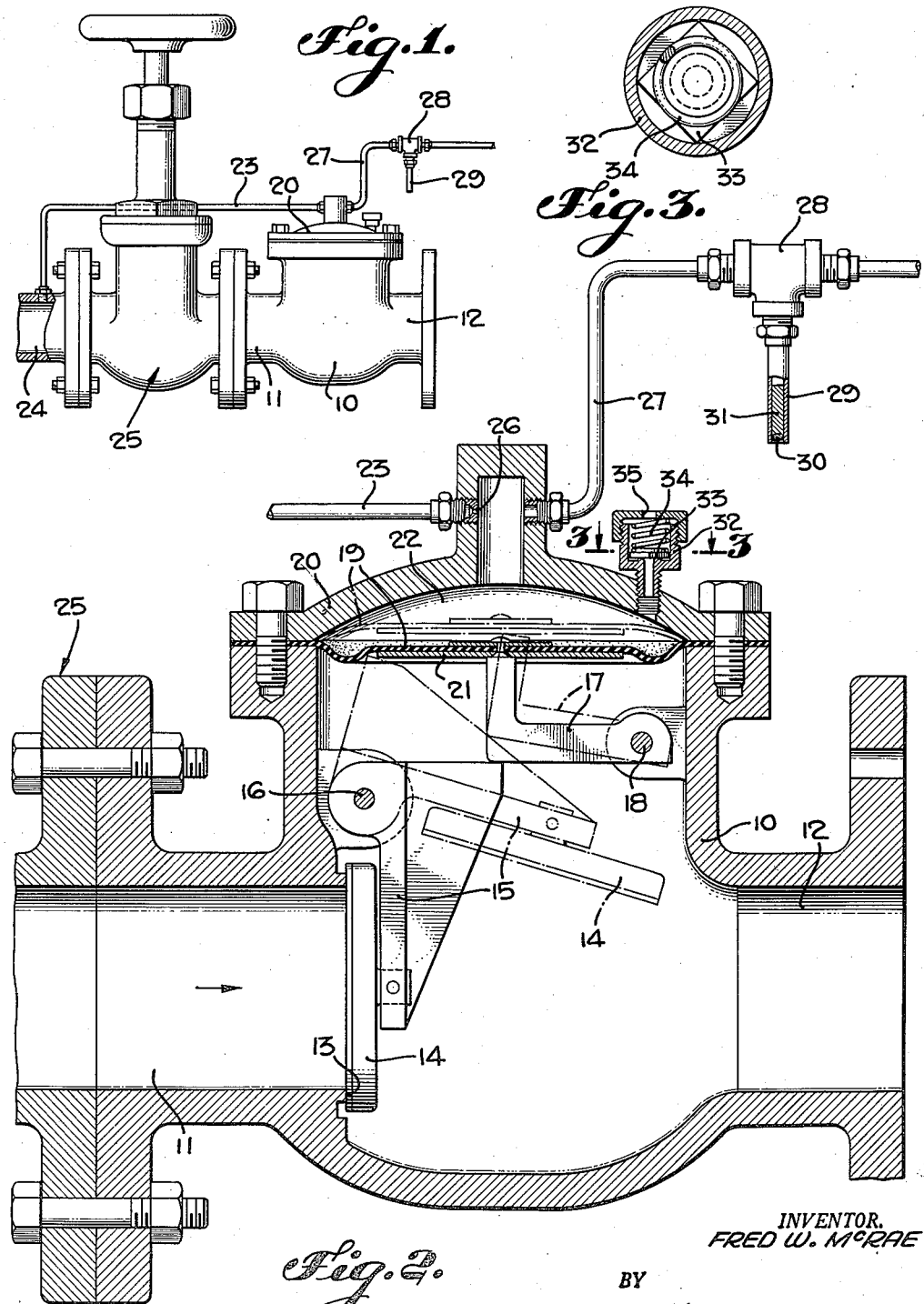
INVENTOR.
FRED W. McRAE
BY
Hazard & Miller
ATTORNEYS

Patented Apr. 8, 1952

2,591,959

UNITED STATES PATENT OFFICE 2,591,959

QUICK OPENING VALVE

Fred W. McRae, Los Angeles, Calif.

Application July 5, 1949, Serial No. 103,138

2 Claims. (Cl. 169—20)

This invention relates to a quick opening valve.

There are many situations wherein it is desirable to have a valve which is normally closed and which it is desirable to quickly open for the purpose of flooding or dumping and wherein the opening of the valve can be quickly accomplished in an automatic manner in the event of a certain contingency. For example, the valve may be of the type used in fire protection wherein, in the event of a fire, the valve will be automatically opened to allow a large volume of water or a fire extinguishing chemical to be quickly discharged to flood a certain area to extinguish the fire. In other situations large tanks or vats may contain acids or other dangerous chemicals which it is desired to quickly dump in the event of a certain contingency. In still other situations it may be desirable to merely open the valve to suddenly release pressure in the event that pressure in the line leading to the valve exceeds a predetermined maximum.

It is an object of the present invention to provide a relatively simple valve of this character which is normally closed and maintained in closed position by the pressure existing in the inlet to the valve. With such an arrangement whatever pressure exists in the inlet a correspondingly greater pressure is effective on the closure to maintain it in seated position against the inlet pressure. On the other hand, in the event of a certain contingency or contingencies occurring the valve closure can be quickly and positively released to enable it to quickly swing into its fully open position and allow immediate maximum flow from the inlet to the outlet such as is desired in flooding for fire extinguishing purposes or the dumping of dangerous chemicals. The improved valve is characterized by the fact that although a pressure responsive means is effective to maintain the valve closure in closed position and is subjected to pressure in the inlet, the pressure that is conducted from the inlet to the pressure responsive means is fed through a relatively restricted passage or orifice. In order to trip and release the valve to allow it to open, means is provided for relieving the pressure effective on the pressure responsive means at a greater rate than that at which the pressure can be built up through the restricted passage or orifice.

With the foregoing and other objects in view, which will be made manifest in the following detailed description and specifically pointed out in the appended claims, reference is had to the accompanying drawings for an illustrative embodiment of the invention, wherein:

Figure 1 is a view in side elevation illustrating diagrammatically the manner of installation of the improved valve;

Fig. 2 is a vertical section through the improved valve; and

Fig. 3 is a horizontal section taken substantially upon the line 3—3 upon Fig. 2.

Referring to the accompanying drawings wherein similar reference characters designate similar parts throughout, the improved valve consists of a valve body 10 having an inlet 11 and an outlet 12. A valve seat 13 is arranged between the inlet and outlet and is adapted to have a valve closure 14 seat thereon. This valve closure is carried by an arm 15 that is pivotally mounted as at 16 within the valve body. A dog or latch 17 is also pivotally mounted within the valve body, the pivot being indicated at 18. When the valve closure is in seating position on the seat 13 the dog or latch 17 is engageable with the top of the arm as shown in Fig. 2, and can serve to hold the valve closure in seating position. It is urged to do so by means of a diaphragm 19 that is secured adjacent its edges beneath the cover or cap 20 on the valve body. This diaphragm carries a metal plate 21 on its underside that is directly engageable with the top of the dog or latch 17. The cap 20 provides a chamber 22 above the diaphragm which is supplied with inlet pressure by means of a conduit or tubing 23. This tubing is preferably connected to the pipe line leading to the inlet 11 so as to receive pressure existing in the pipe line 24 a short distance upstream from the valve seat 13.

In the preferred arrangement, as illustrated in Fig. 1, a manually operable gate valve 25 is interposed between the inlet 11 and the connection between the tubing 23 and the pipe line 24. The tubing 23 has incorporated therein a fitting which provides a relatively small orifice 26 which is sufficiently small so that although upstream pressure will be conducted to the chamber 22 fluid cannot pass through the orifice 26 at a very high rate or velocity.

As one means for tripping the valve to allow the closure to open a conduit 27 may also be connected to the cap 20 to communicate with the chamber 22. This conduit may extend a considerable distance around a plant or building in which there is a fire hazard. At one or more points along its length it may have T's 28 incorporated therein to which laterally extending nipples 29 are connected. These nipples may have in their outer ends seals 30 formed of relatively low melting point metal designed to melt and open the conduit 27 when a predetermined temperature is exceeded. In the event that the valve embodying the present invention is used in conjunction with a line 24 conducting a liquid such as water or a fire extinguishing liquid chemical the nipples 29 may be partially filled behind the seals 30 with a low melting point solid indicated at 31 such as tallow, paraffin, or the like. This solid is designed to insulate the seals 30 but at the same time to be capable of being easily melted at a comparatively low temperature. If the nipples 29 were permitted to be filled with liquid immediately behind the seal there might, in certain installations, be danger of the liquid cooling the seal 30 to a sufficient extent so that it would not melt at the desired temperature. On the other hand, if the fluid in the conduit or pipe line 24 is a gas, such as for example carbon dioxide, the use of the low melting point solid 31 is frequently unnecessary. The nipples 29 and their contained seals 30 are arranged along the length of the tubing 27 so as to be strategically located where fires or excessive temperatures may occur.

The operation of the above described structure is substantially as follows:

Under normal conditions the pressure in the pipe line 24 will be excessive on the closure 14 urging the closure to open. However, this same pressure is conducted through the tubing 23 and the orifice 26 to the top of the diaphragm 19 and as the diaphragm has a greater area than the area of the closure 14 exposed to inlet pressure the diaphragm will be forced downwardly causing the dog or latch 17 to maintain the closure 14 seated on the seat 13 against the inlet pressure.

In the event of a fire the temperature of which would be sufficient to melt the seal 30 and the solid 31 where this is employed the conduit 27 is immediately opened and the opening formed by the melted seal is materially greater than the size of the orifice 26. Consequently, the pressure in the chamber 22 will be relieved and at a rate greater than that at which the pressure can be built up again through the restricted orifice 26. When the pressure in the chamber 22 is thus relieved, the force acting on the dog 17 by the diaphragm is less than the force effective on this dog from the pressure on the face of the valve closure 14. Consequently, the valve closure will be swung into open position as illustrated in dotted lines on Fig. 2, allowing the fluid in the pipe line 24 to instantly flow at maximum capacity from the inlet to the outlet, thus flooding the area with water or fire extinguishing chemical or when the valve is connected to a tank or reservoir of dangerous chemical, the opening of the valve allows it to be immediately dumped. If the valve is used in conjunction with a fire preventative system the outlet 12 is normally connected to a sprinkler system although this is not necessary where complete flooding is desirable.

In some instances, it is desirable to quickly open closure 14 whenever the pressure in the pipe line 24 exceeds a predetermined degree. To this end I have illustrated the cap 20 as being equipped with a popoff valve consisting of a valve chamber 32 having a seat therein for a valve closure 33. This valve closure is normally urged into seated position by means of a calibrated compression spring 34. Springs of this character are obtainable which are so designed as to maintain the valve closure 33 in seated position until a certain pressure is reached. When the force effective on the spring 34 exceeds a predetermined degree it yields rather readily allowing the closure 33 to be unseated. In the preferred form of construction the valve housing 32 is cylindrical whereas the valve closure 33 is rectangular in form as shown in Fig. 3, so that when the closure is unseated by excessive pressure, some of the fluid in the chamber 22 may readily escape through one or more outlets 35. When pressure is thus quickly relieved in the chamber 22 even though it may be for only a very short period of time, the diaphragm 19 will permit the dog or latch 17 to be lifted and thus release the closure 14 for immediate opening movement. Any other means may be employed for relieving the pressure in the chamber 22. Thus, if it is desired to open the closure 14 from a point remote from the valve a manual valve might be incorporated in the conduit 27. Also, readily frangible closures might be employed in lieu of nipples 29 or in conjunction therewith designed to break in the event of an explosion. The only essential requirement is that some means be provided for relieving the pressure in chamber 22 at a faster rate than that at which it can be built up through the restricted orifice 26.

The gate valve 25 is preferably employed in order to initially set the valve. This gate valve is kept closed while the closure 14 is in closed position and the latch or dog 17 is in engagement with the arm 15. Pressure in the pipe line 24 is slowly conducted through the orifice 26 to the chamber 22 and with the passage of time will build up the pressure in the chamber 22 so that it equals the pressure in the pipe line 24. When this has occurred the gate valve 25 may be opened and the pressure effective on the face of the closure 14 is then incapable of opening the closure until such time as the pressure in the chamber 22 is relieved as above explained. The popoff or relief valve 33 may be employed either in conjunction with the conduit 27 or in lieu thereof depending upon different installations and the type of protection that is desired.

From the above-described construction it will be appreciated that the improved valve is of relatively simple yet highly sturdy construction and that it will properly function to quickly open to maximum capacity automatically in the event of the occurrence of certain contingencies as above explained.

Various changes may be made in the details of construction without departing from the spirit and scope of the invention as defined by the appended claims.

I claim:

1. A quick opening valve comprising a body having an inlet and an outlet adapted to be connected in a conduit, a valve seat therein arranged transversely to the line of flow between the inlet and outlet, a valve closure swingably mounted on the interior of the body adapted to seat upon the valve seat, a shoulder on the closure arranged at approximately right angles to the plane of the closure, a latch engageable with the closure pivotally mounted within the body for swinging movement about an axis parallel to the axis of swing of the closure but spaced therefrom, a diaphragm in the body engageable with the latch when depressed to cause the latch to hold the closure in seated position against its seat, means for conducting fluid pressure to the upper side of the diaphragm to hold the diaphragm depressed, and means for releasing pressure on the upper side of the diaphragm upon the occurrence of a certain event to allow the latch to rise and permit the closure to open.

2. A quick opening valve comprising a body having an inlet and an outlet adapted to be connected in a conduit, a valve seat therein arranged around the inlet, a valve closure swingably mounted on a wall of the body over the inlet adapted to seat upon the valve seat, a shoulder on the closure arranged at approximately right angles to the plane of the closure, a latch pivotally mounted within the body on the opposite wall thereof for swinging movement about an axis parallel to the axis of swing of the closure engageable with the shoulder to hold the closure seated, a diaphragm in the housing over the latch engageable therewith to hold the latch against the shoulder, means including a restricted orifice for supplying fluid pressure to the interior of the body over the diaphragm to hold the diaphragm depressed, and means for releasing pressure from the interior of the body over the diaphragm upon the occurrence of a certain event at a faster rate than that at which it may be supplied through the restricted orifice so that inlet pressure effective on the closure may swing the closure into open position.

F. W. McRAE.

REFERENCES CITED

The following references are of record in the file of this patent:

UNITED STATES PATENTS

| Number | Name | Date |
|---|---|---|
| 314,649 | Campbell | Mar. 31, 1885 |
| 392,251 | Wyman | Nov. 6, 1888 |
| 570,018 | Hill | Oct. 27, 1896 |
| 1,206,485 | Tague | Nov. 28, 1916 |
| 1,315,079 | Bernd | Sept. 2, 1919 |
| 1,402,837 | Christian | Jan. 10, 1922 |
| 1,736,256 | Doughty | Nov. 19, 1929 |
| 1,849,764 | Loepsinger | Mar. 15, 1932 |
| 1,945,284 | Lowe | Jan. 30, 1934 |
| 2,357,133 | Rider | Aug. 29, 1944 |

FOREIGN PATENTS

| Number | Country | Date |
|---|---|---|
| 297,270 | Great Britain | Sept. 20, 1928 |